J. L. WIGGINS.
IRRIGATION PIPE.
APPLICATION FILED MAY 17, 1909.
953,080.
Patented Mar. 29, 1910.
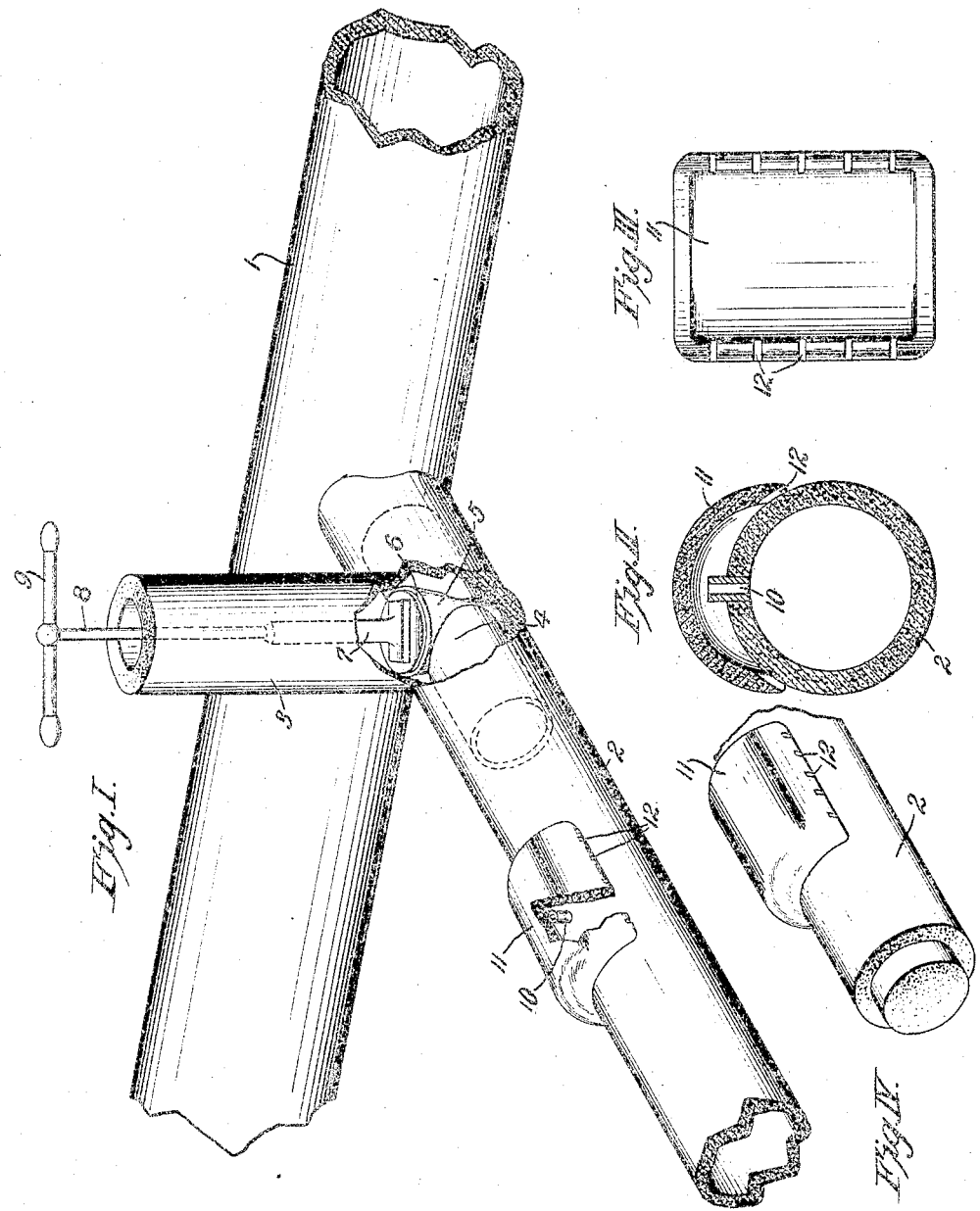
Witnesses:—
E. H. Cahill
Myrtle M. Jackson
Inventor,
John L. Wiggins,
By Arthur C. Brown
Attorney.

UNITED STATES PATENT OFFICE.

JOHN L. WIGGINS, OF DALLAS, TEXAS.

IRRIGATION-PIPE.

953,080.  Specification of Letters Patent. Patented Mar. 29, 1910.

Application filed May 17, 1909. Serial No. 496,540.

*To all whom it may concern:*

Be it known that I, JOHN L. WIGGINS, a citizen of the United States, residing at Dallas, in the county of Dallas and State of Texas, have invented certain new and useful Improvements in Irrigation-Pipes; and I do declare the following to be a full, clear, and exact description of the invention, such as will enable others skilled in the art to which it appertains to make and use the same, reference being had to the accompanying drawings, and to the figures of reference marked thereon, which form a part of this specification.
My invention relates to irrigation conduits, and has for its principal object to provide a conduit from which water may be delivered evenly from various points throughout its length.
A further object of my invention is to provide means for preventing the delivery ports of the conduits from clogging, when covered with earth.

In accomplishing these objects I have provided the improved details of structure which will presently be fully described and pointed out in the claims, reference being had to the accompanying drawings, in which:—
Figure I is a perspective view of an irrigating main and lateral conduit constructed according to my invention, parts being broken away for better illustration. Fig. II is a cross sectional view of the lateral conduit and its discharging nozzle and hood. Fig. III is a bottom plan view of the hood. Fig. IV is a detail view of the outer end of one of the conduits.

Referring more in detail to the parts:—1 designates the main conduit and 2 a lateral which is connected therewith, both being preferably formed of concrete. On the lateral 2, adjacent to the main conduit, is a branch 3 which is adapted for extension to a point above, or near, the surface of the ground. Located in the lateral is a hollow core 4, having a valve casing 5 that is open toward the branch 3 and contains a valve plug 6 having a shank 7 that projects upwardly into the branch and carries a rod 8 that extends above the branch and has a handle portion 9 by which the valve is turned to admit or cut off the flow of water from the main conduit to the lateral. The lateral 2 is perforated at intervals throughout its length and has the tubes or nozzles 10 fitted into such perforations and preferably extended beyond the periphery of the conduit. The perforations are preferably located at the top of the conduit, so that before the water may escape therefrom the conduit must be filled to overflowing, and a pressure exerted on the water in the conduit.

In order to prevent earth from entering and clogging the nozzles 10, I provide a cover therefor which consists of a semi-cylindrical body having end flanges that fit snugly over the conduit and side flanges having beveled edges that fit closely against the sides of the conduit and are provided with slots 12 through which water may escape from beneath the cover.

The main conduit and laterals are plugged at their free ends, as illustrated in Fig. IV, so that the only escape for the water is through the nozzles 10, just described.

No fastening devices for holding the covers 11 in place are required. These covers are much superior to closed casings that surround the pipe, as the latter are difficult to install, and impossible to remove, unbroken, from a continuous buried pipe when access must be had to the pipe orifices.

In using my improved conduit, water is admitted from the main conduit to the laterals through the valved core 4. When the lateral has been filled, the water will rise through the nozzles 10 into the chambers formed by the covers 11 and escape through the slots 12 into the ground, the slots providing a free exit for the water while the cover protects the nozzles from earth or foreign matter which might enter and clog same, and also provides a chamber into which air may be forced from the pipe when water is admitted thereto.

Having thus described my invention, what I claim as new therein and desire to secure by Letters-Patent is:—

1. The combination with a complete, integral, tubular pipe body having an outlet aperture, of a cover member having end flanges adapted to seat on said body, and beveled side flanges adapted to seat on the pipe sides, said side flanges being slotted to provide outlets, substantially as set forth.

2. The combination with a pipe body having an outlet aperture, of an arched cover member seated on said pipe body and extending over said aperture, said cover member having end flanges adapted to seat snugly on the pipe body and provided with slots at its side edges, substantially as and for the purpose set forth.

3. The combination of a subterraneous pipe, laid horizontally, an outlet orifice in the upper side of the pipe, a semi-cylindrical cover piece, of the same curvature as that of the pipe, said cover having lateral edges fitting the surface of the pipe, said edges having downwardly directed orifices therein; said cover having down-turned end flanges fitting the surface of the pipe and without orifices.

In testimony whereof I affix my signature in presence of two witnesses.

JOHN L. WIGGINS.

Witnesses:
MYRTLE M. JACKSON,
E. A. CAHILL.